US010103608B2

(12) United States Patent
Marshall et al.

(10) Patent No.: US 10,103,608 B2
(45) Date of Patent: Oct. 16, 2018

(54) GENERATOR ROTOR FRETTING FATIGUE CRACK REPAIR METHOD

(71) Applicant: General Electric Company, Schenectady, NY (US)

(72) Inventors: Nathaniel Philip Marshall, Clifton Park, NY (US); Alexander Gabriel Beckford, Glenville, NY (US); Eric Steven Buskirk, Scotia, NY (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 14/689,912

(22) Filed: Apr. 17, 2015

(65) Prior Publication Data

US 2016/0308424 A1 Oct. 20, 2016

(51) Int. Cl.
*H02K 15/00* (2006.01)
*H02K 3/487* (2006.01)

(52) U.S. Cl.
CPC ......... *H02K 15/0006* (2013.01); *H02K 3/487* (2013.01); *H02K 15/0018* (2013.01)

(58) Field of Classification Search
CPC . H02K 15/0006; H02K 15/0018; H02K 3/487
USPC ....................................................... 310/214
See application file for complete search history.

(56) References Cited

U.S. PATENT DOCUMENTS

| 4,363,982 A | 12/1982 | Kaminski |
| 5,027,500 A | 7/1991 | Keck et al. |
| 5,174,011 A * | 12/1992 | Weigelt ............... H02K 15/0006 29/402.07 |
| 5,459,363 A | 10/1995 | Miyakawa et al. |
| 5,883,456 A | 3/1999 | Gardner et al. |
| 6,115,917 A | 9/2000 | Nolan et al. |
| 6,218,756 B1 | 4/2001 | Gardner et al. |
| 6,615,470 B2 * | 9/2003 | Corderman ............ B22D 19/10 29/402.11 |
| 6,849,972 B1 | 2/2005 | Barnes et al. |
| 6,941,639 B2 * | 9/2005 | Zhang ................. H02K 15/0006 29/402.05 |

(Continued)

OTHER PUBLICATIONS

European Search Report and Opinion issued in connection with corresponding EP Application No. 16165508.9 dated Sep. 1, 2016.

*Primary Examiner* — Alex W Mok
(74) *Attorney, Agent, or Firm* — James W. Pemrick; Ernest G. Cusick; Frank A. Landgraff

(57) ABSTRACT

A method of servicing, or repairing a crack in, a dovetail portion of a dynamoelectric machine's rotor coil slot wall. The coil slot wall includes a radial entry surface connected to an inwardly tapered surface. The inwardly tapered surface is connected to an intermediate radial surface. A machining step machines a first groove in the radial entry surface and inwardly tapered surface. The first groove extends linearly to the intermediate radial surface. The first groove is configured so that a smooth and linear surface is created along a length of the first groove. A second machining step machines a second groove in the intermediate radial surface in an orientation substantially perpendicular to the first groove. A portion of the second groove contacts a portion of the first groove. At least one of the first groove and the second groove are configured to remove damaged material from the coil slot wall.

18 Claims, 6 Drawing Sheets

(56) References Cited

U.S. PATENT DOCUMENTS

| | | | |
|---|---|---|---|
| 7,122,931 B2 * | 10/2006 | Zhang | H02K 15/0006 |
| | | | 29/598 |
| 7,690,111 B2 * | 4/2010 | Coffey | B23B 27/04 |
| | | | 228/119 |
| 7,793,399 B2 | 9/2010 | Matsuyama et al. | |
| 7,845,076 B2 | 12/2010 | Beckford et al. | |
| 7,866,020 B2 | 1/2011 | Matsuyama et al. | |
| 8,225,447 B2 | 7/2012 | Calkins, Jr. et al. | |
| 8,245,375 B2 * | 8/2012 | Coffey | B23B 27/04 |
| | | | 269/45 |
| 8,333,006 B2 | 12/2012 | Matsuyama et al. | |
| 2005/0198821 A1 | 9/2005 | Reville et al. | |
| 2007/0269608 A1 | 11/2007 | Saito et al. | |
| 2008/0278009 A1 | 11/2008 | Reville | |

* cited by examiner

GENERATOR ROTOR FRETTING FATIGUE CRACK REPAIR METHOD

BACKGROUND OF THE INVENTION

This invention relates to generator rotors and specifically, to the repair of generator rotors that have experienced fretting damage and/or cracks in the rotor teeth located at the butt joints of the axially aligned rotor wedges.

Conventional dynamoelectric machines, such as generators used with gas and steam turbines, employ forged rotors of magnetic material into which radial slots are machined for receiving the conductive turns of field windings which are interconnected such as to produce a desired magnetic flux pattern. Typically, included in such conventional rotor slots are creepage blocks at both the top and bottom ends of the slot as well as coil slot wedges for resisting the radially outward forces exerted on the windings when the rotor is operational.

The slot wedges, which are generally dovetail shaped, are used to maintain the copper coils in place while the rotor is spinning at, for example, 3600 revolutions per minute. In the prior art such coil slot wedges were normally 6 to 12 inches long with a number of such wedges being required for each coil slot, particularly in the longer rotors with high electrical ratings. In an effort to decrease the number of parts that are required for assembly as well as increasing the overall speed of such assembly, full length wedges have been used in certain applications. For other applications, tolerances preclude the use of full length wedges and, in these cases, two or more wedges are used in each rotor slot. Cracks have been found, however, in the radial slot walls of several generators, at the butt joint between adjacent rotor wedges, apparently due to fretting damage found at the ends of steel wedges. If allowed to remain in the rotor, these cracks can grow and potentially cause a catastrophic failure of the rotor.

One prior solution to the fretting fatigue problem was to machine away the damaged tooth material and to replace the multiple original short steel rotor pole wedges with a single, full-length aluminum wedge. As already mentioned above, however, there are many generator rotors that cannot make use of full length wedges and require the continued use of plural shorter wedges with original dimensions.

BRIEF DESCRIPTION OF THE INVENTION

This invention provides a process for repairing a generator rotor which has fretting fatigue damage in the rotor teeth at the butt joints of steel rotor wedges. The repair process substantially eliminates existing cracks by machining away any damaged material to create a shape which minimally reduces the low and high cycle fatigue life of the rotor.

In one embodiment, the slot side wall is machined along both a vertical entry surface and a tapered radially outward dovetail surface to form a single groove that removes the damaged material. The machined areas are concave in shape in a manner that only minimally reduces the low and high cycle fatigue life of the rotor.

In another embodiment, the machining process is continued into the intermediate vertical (or radial surface of the dovetail, and, in this area, extended axially in opposite directions such that the machined area takes on an inverted T-shape.

Future fretting damage is substantially eliminated not only by removing the damaged material, but also by replacing the original steel wedges with similarly sized aluminum wedges. This solution is advantageous in that it does not require large scale machining or a high speed rotor balance operation, and is therefore suitable for implementation on site. When the wedges are replaced, the butt joint between adjacent wedges may be aligned with, or offset from the repaired area.

Accordingly, in one aspect of the present invention a method is provided for servicing, or repairing a crack in, at least one side of a dovetail portion of a dynamoelectric machine's rotor coil slot wall. The rotor coil slot wall includes at least a radial entry surface connected to an inwardly tapered surface, and the inwardly tapered surface is connected to an intermediate radial surface. The method includes a first machining step that machines a first groove in the radial entry surface and the inwardly tapered surface. The first groove extends linearly to the intermediate radial surface, and the first groove is configured so that a smooth and linear surface is created along a length of the first groove. A second machining step machines a second groove in the intermediate radial surface in an orientation substantially perpendicular to the first groove. At least a portion of the second groove contacts a portion of the first groove. At least one of the first groove and the second groove are configured to remove damaged material from the coil slot wall.

In another aspect of the present invention a method is provided of servicing, or repairing a crack in, at least one side of a dovetail portion of a rotor coil slot wall in a generator. The rotor coil slot wall includes a radial entry surface connected to an inwardly tapered surface, and the inwardly tapered surface is connected to an intermediate radial surface. The radial entry surface and the intermediate radial surface are substantially parallel to each other. The method includes a first machining step that machines a first groove in the radial entry surface and the inwardly tapered surface. The first groove extends linearly from an outer rotor surface to the intermediate radial surface, and the first groove is configured so that a smooth and linear surface is created along a length of the first groove. A second machining step machines a second groove in the intermediate radial surface in an orientation substantially perpendicular to the first groove and substantially axially with respect to the generator. At least a portion of the second groove contacts a portion of the first groove. At least one of the first groove and the second groove are configured to remove damaged material from the coil slot wall or to act as a preventive measure against damage to the coil slot wall.

The invention will now be described in detail in connection with the drawings identified below.

DETAILED DESCRIPTION OF THE INVENTION

Figure 1:
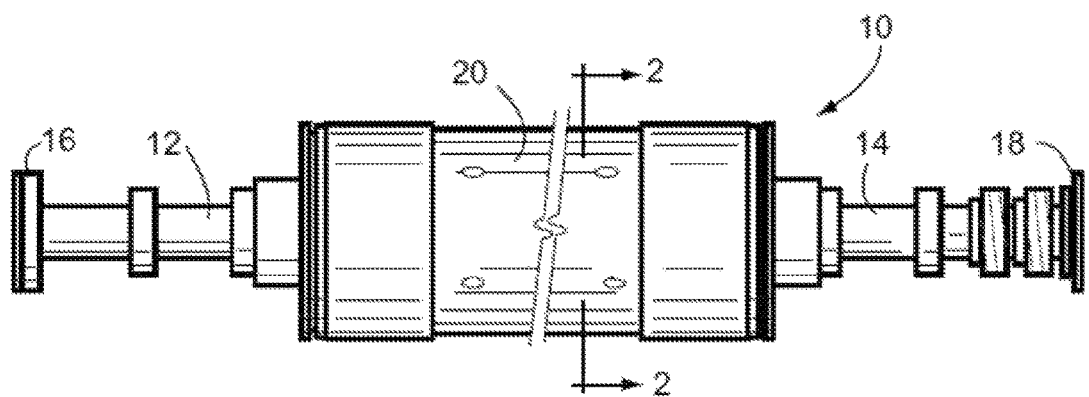
FIG. 1 is a side elevation of a conventional generator rotor including radially oriented coil slots.
Figure 2:
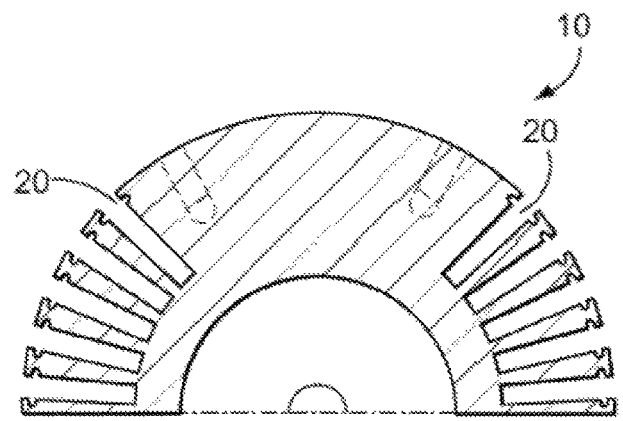
FIG. 2 is a partial cross section of the rotor body taken along the lines 2-2 of FIG. 1.

FIGS. 1 and 2 illustrate a typical rotor 10 for a dynamo-electric machine wherein the rotor includes conventional elements such as rotor end shaft portions 12, 14 and couplings 16, 18 for connection with a turbine or gear reduction unit. Of particular significance here are the axially oriented coil slots 20 arranged circumferentially about the mid-section of the rotor, that are used for holding the copper field windings or coils.

Figure 3:
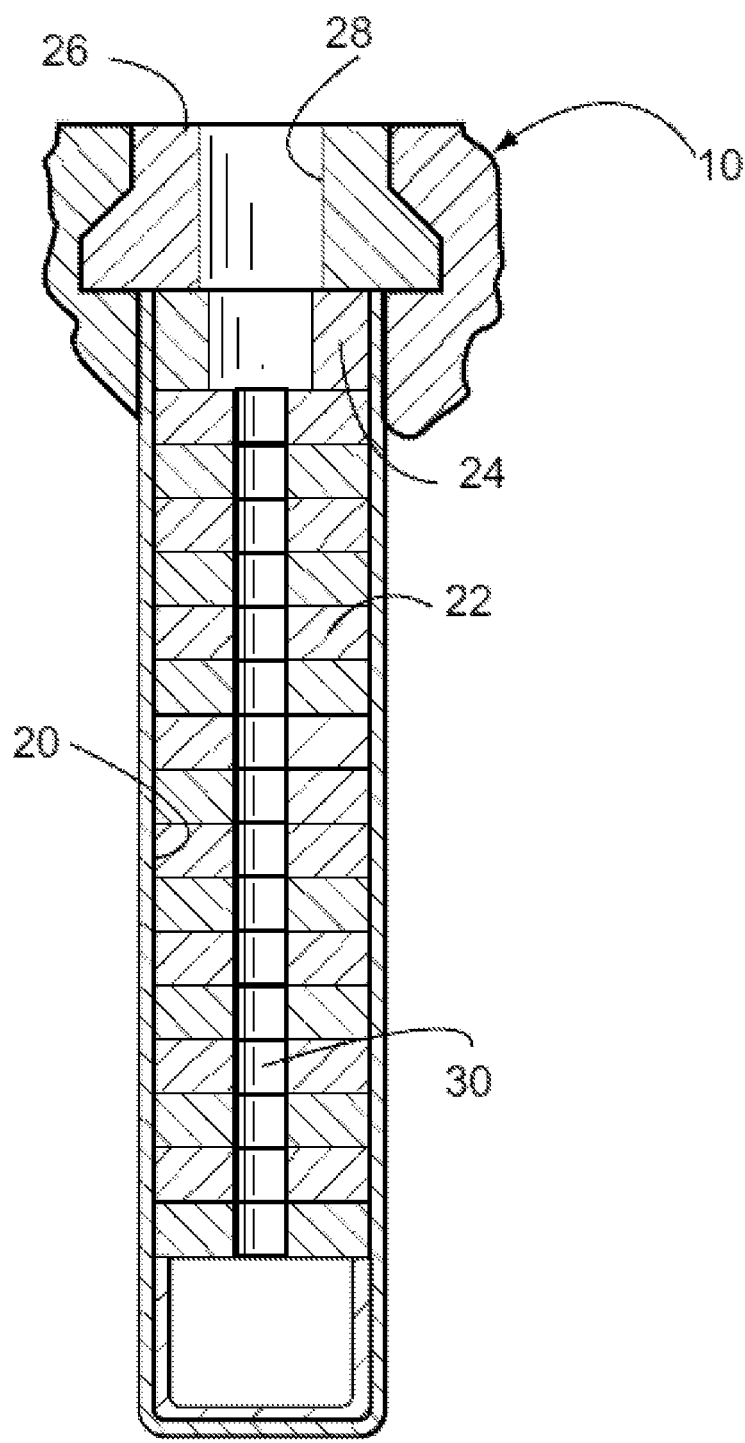
FIG. 3 is a cross section through a typical coil slot and contents thereof.

With further reference to FIG. 3, the coil slots 20 are each radially directed and typically contain, in a radially outward sequence, insulated copper coils 22, a creepage block 24, and a plurality of axially aligned slot wedges 26. The wedges have a generally dovetail shape in cross section, and are located and arranged so as to maintain the copper coils 22 and creepage block 24 in place while the rotor is spinning. The slot wedges 26 may also contain ventilation holes 28 (one shown) which are in general alignment with ventilation channels 30 (one shown) which pass through the copper conductors or coils, as well as through the creepage block 24.

Figure 7:
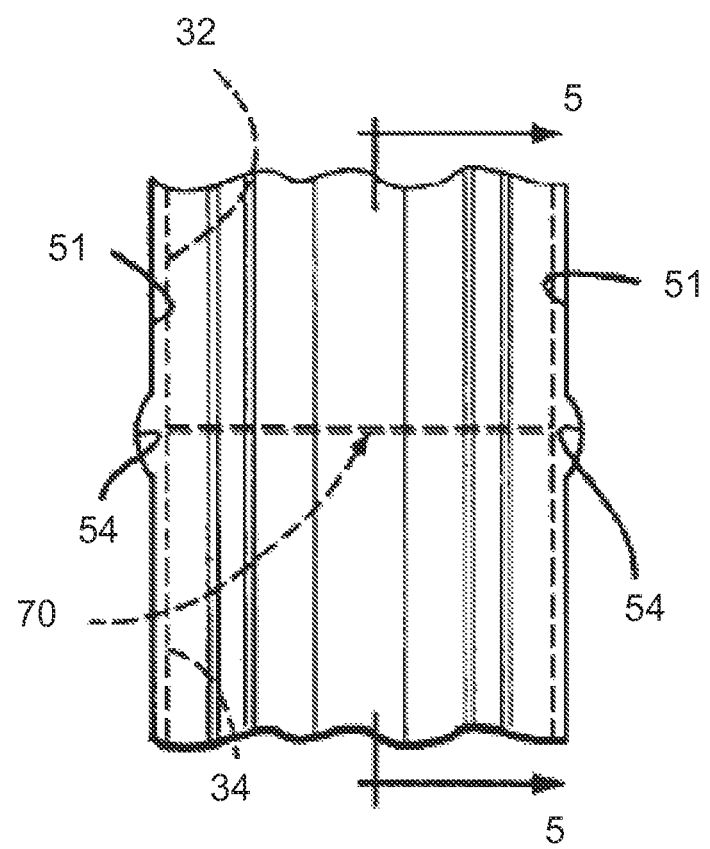
FIG. 7 is a plan view of the rotor slot shown in FIG. 6, with adjacent wedges shown in phantom, according to an aspect of the present invention.

Fretting fatigue damage has occurred in the coil slots 20, specifically in the slot walls, at the butt joints of the axially adjacent steel rotor wedges 26 (a butt joint 70 between a pair of adjacent wedges 32, 34 is shown in phantom in FIG. 7). Fretting occurs whenever a junction between components is subjected to a cyclic load that leads to small tangential displacement over part of the interface. A two dimensional (radial-axial) finite element fretting model was developed to model the mechanics of contact between the rotor slot 20, and particularly the dovetail-shaped portion 36 of the slot wail 38 (see FIGS. 4 and 5) and the wedge 26, where fretting initiated cracks were observed in the rotor. The model provided a qualitative understanding of the fretting mechanism, and provided a basis for preliminary assessment of various wedge redesign options.

Figure 4:
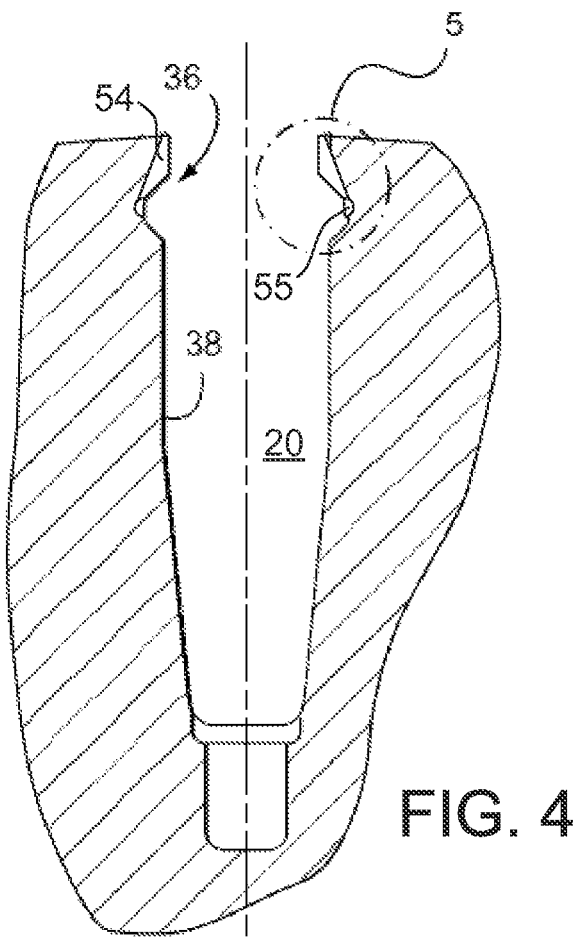
FIG. 4 is a cross section of a rotor slot with damaged areas machined away, according to an aspect of the present invention.
Figure 5:
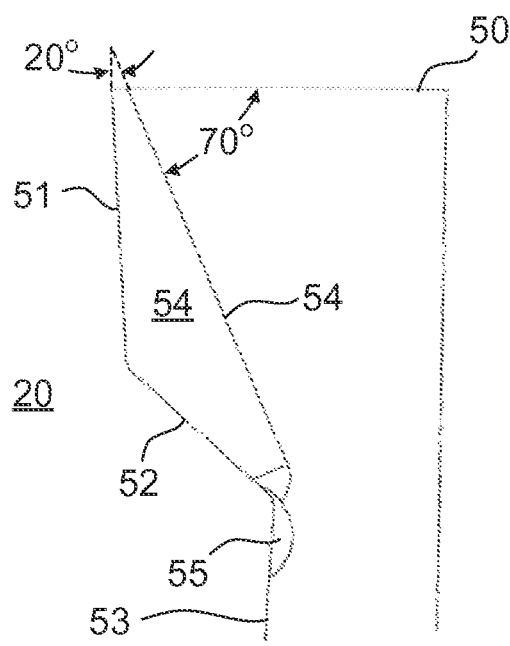
FIG. 5 is an enlarged detail taken from FIG. 4, according to an aspect of the present invention.

The present invention has two significant aspects in terms of repair of fretting cracks in rotor teeth. First, the damaged material is ground out of the rotor and a local stress field is altered near the repaired ends. With reference to FIGS. 4 and 5, the machined area is in the wedge-receiving dovetail portion 36 of the slot wail 38, As already noted, this is the area of the slot wail that is susceptible to fretting cracks, and particularly, at the interface of two abutting steel wedges. The outer rotor surface 50 forms an outer most portion of the rotor. The coil slots 20 include a radial entry surface 51, an inwardly tapered surface 52 and an intermediate radial surface 53. An opposing side of slot 20 will have the same surfaces, but in an opposing configuration. The radial entry surface 51 extends radially downward until it connects to the inwardly tapered surface 52. The inwardly tapered surface angles over and is connected to the intermediate radial surface 53.

A repair method according to the present invention may use a suitably shaped and sized machining bit (e.g., a 0.625" diameter bit) to machine a first groove 54 in both the radial entry surface 51 and the inwardly tapered surface 52. The first groove 54 extends linearly to the intermediate radial surface 53. The first groove 54 is also configured to prevent the formation of edge discontinuities along the surface of the first groove between the radial entry surface 51 and the inwardly tapered surface 52. The mid-region of the first groove removes material in likely crack locations. Post-machining inspections will be facilitated, especially in likely crack locations, by the linear (i.e., in a straight line) surface of the first groove. If the first groove had a non-linear configuration (e.g. formed by two lines/surfaces at an angle to each other) then post-machining inspections could be more difficult due to this edge discontinuity between the two lines/surfaces. By removing (or preventing) the edge discontinuities, post-machining eddy current inspections (e.g., inspections for cracks) are facilitated by the continuous smooth and linear surface along the first groove. The first groove 54 may be oriented to extend in a direction of about 20 degrees from the radial entry surface 51. Alternatively, the first groove 54 may be oriented to extend in a direction of about 70 degrees from the outer rotor surface 50. These angles are examples only and the specific angle chosen may vary from the examples given as desired in the specific application. An important feature is that the first groove extends substantially linearly from the outer rotor surface 50/radial entry surface 51 to the intermediate radial surface 53. This linear configuration prevents formation of an edge discontinuity on the groove surface between the radial entry and inwardly tapered portions of coil slot 20. As examples only, the first groove 54 may have a maximum depth of about 0.195 inches and a width of about 0.37 inches or more. The maximum depth is chosen as this geometry removes cracks more readily, that is the deepest part of the profile (where most material is removed) is at the most likely location of possible cracks. However, it is to be understood that the specific values chosen for the depth and width will vary in specific applications and for the specific machine.

A second groove 55 may be machined in the intermediate radial surface 53. The second groove 53 is oriented in a substantially perpendicular direction with respect to the first groove 54. For example, the second groove 55 may be machined in an axial direction with respect to rotor 10. The second groove 55 may also be configured to contact a portion, of the first groove 54, as shown in FIG. 4. The first groove 54 and/or the second groove 55 are configured to remove damaged material (e.g., a crack) from the coil slot wail, and both grooves 54, 55 may act as a preventative measure against future damage to the coil slot wall. The machining work may create a first concave groove 54 and a second concave groove 55. Once the material is machined to form the grooved portions, the sharp edges along the boundaries of both portions may be radiused. Machining in this manner only minimally reduces the low and high cycle fatigue life of the rotor. Where appropriate (i.e., depending on the crack location and extent of the crack), the repair may be effected by forming the first groove 54 only. When the wedges are replaced, the butt joint between adjacent wedges may be centered on the machined regions (i.e., on the radial centerline through the groove 54. Alternatively, the wedge butt joint may be axially offset from the repaired area.

Figure 6:
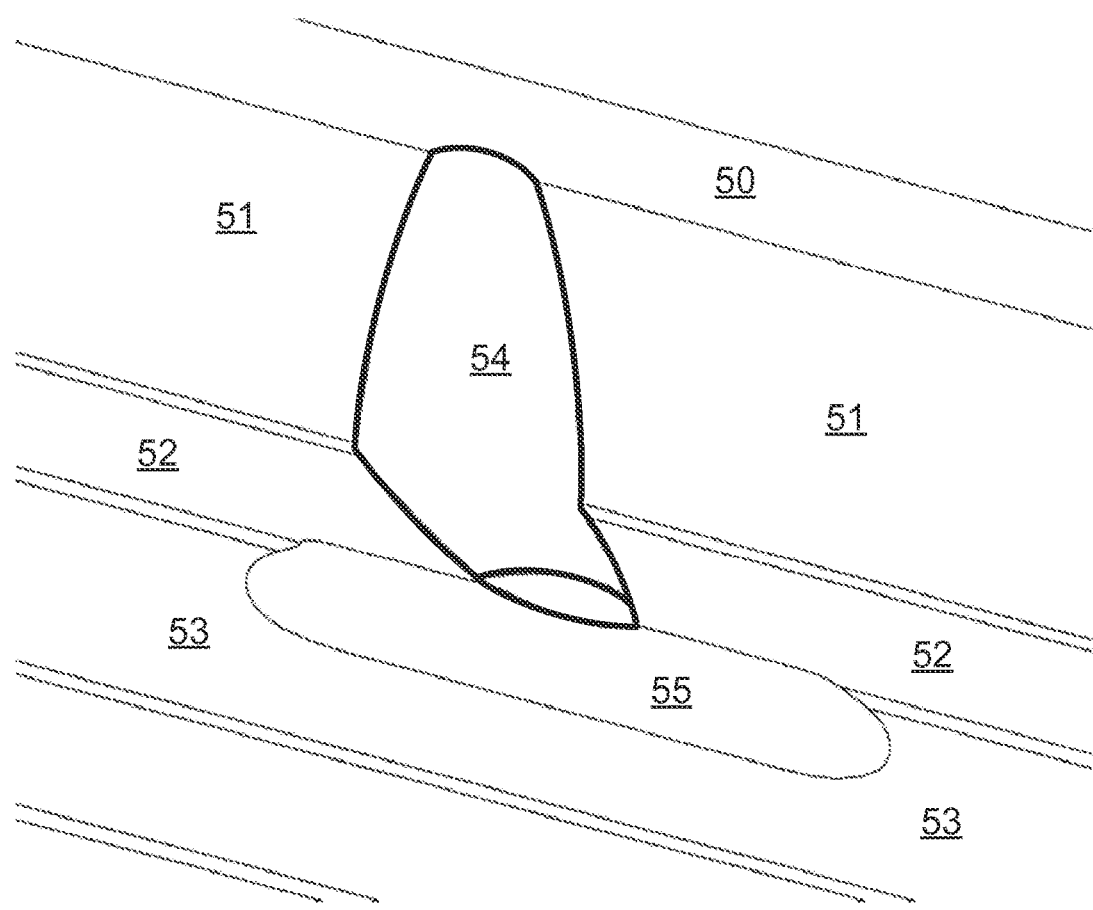
FIG. 6 is a perspective view of the rotor slot, showing damaged areas machined away from the slot wall, according to an aspect of the present invention.

FIG. 6 is a perspective view of the rotor slot, showing damaged areas machined away from the slot wall (as shown In cross-section by FIG. 5). The first groove 54 extends from the outer rotor surface 50 and/or radial entry surface 51 in a linear manner until it reaches the intermediate radial surface 53. The first groove 54 may be configured to be wider than the second groove 55. For example, if the height (measured radially) of the second groove 55 is about 0.35 inches, then the width (measured axially) of the first groove 54 may be about 0.70 inches. As can be seen the second groove extends in a axial direction along the intermediate radial surface. The axial length of the second groove may be about 1.0 inches to about 2.0 inches, or any suitable length as desired in the specific application. Both the first groove and the second groove are configured to contact each other and all groove edges may be radiused to minimize or eliminate stress points.

FIG. 7 is a plan view of the rotor slot shown in FIG. 6, with adjacent wedges shown in phantom. A butt joint 70 is shown between two axially adjacent rotor wedges 32, 34. The first groove 54 is centered on and located across from the butt joint 70, as this is the region most likely to experience fretting damage. Thus, the machined first and second grooves 54, 55 take the shape of an inverted "T," with first groove 54 serving as the stem and second groove 55 serving as the cross member of the "T". It is also noted that the centerline through grooves 54, 55 may, again, be aligned with the butt joint between the wedges, or axially offset therefrom.

Figure 8:
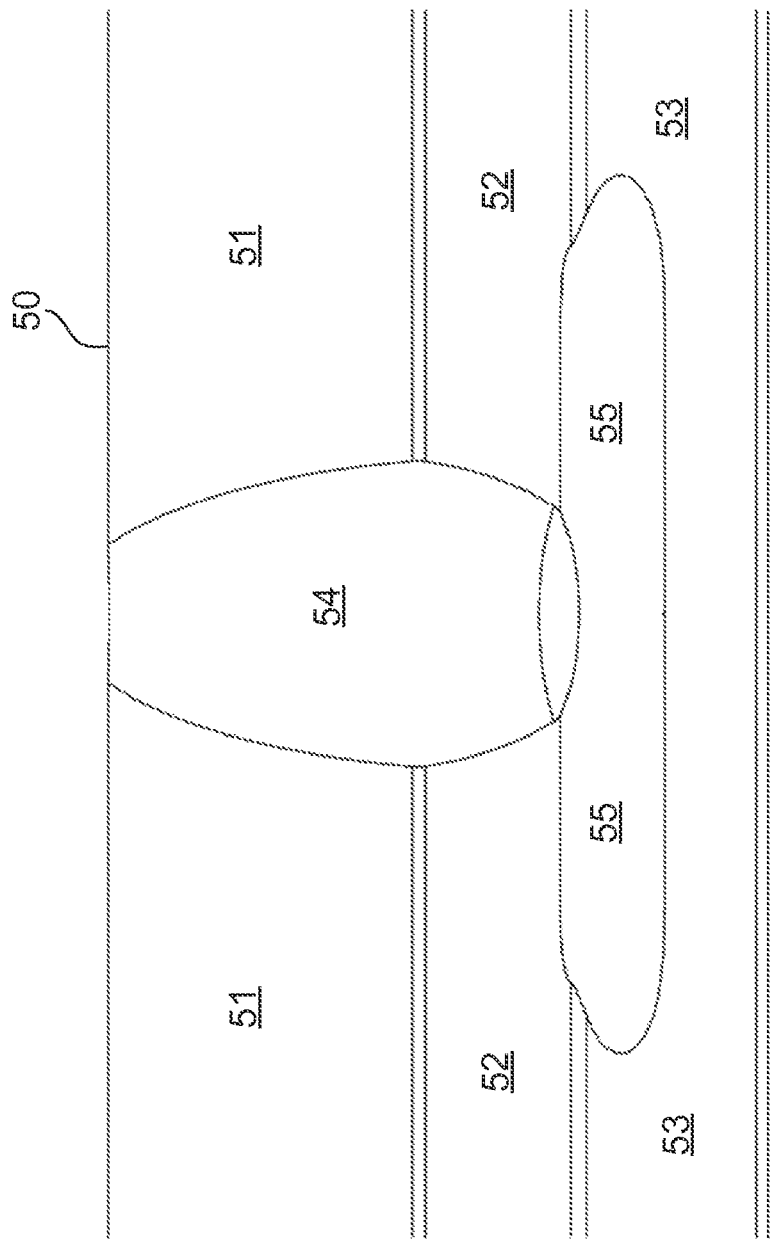
FIG. 8 is a side view of the rotor slot, showing the first and second grooves machined into the slot wall, according to an aspect of the present invention.

FIG. 8 is a side view of the rotor slot, showing the first and second grooves machined into the slot wall, according to an aspect of the present invention. This view would be seen from inside the coil slot 20 looking towards the slot wall 38. The first groove 54 forms a smooth surface and a linearly extending groove that facilitates post-machining inspections at the locations along the groove where cracks are most likely to have been removed.

Once the machine repair is completed, the steel wedges 32, 34 are replaced, preferably with aluminum wedges of the same size, located in the same positions relative to the repaired areas. This has been shown to minimize the potential for future fretting damage in the rotor. However, the replacement wedges may be steel, particularly if, for example, aluminum wedges are not available.

It should also be noted that the drawings illustrate repaired areas on opposite sides of the slot. If a crack appears on only one side of the slot, the repair procedure may be confined to that side. However, the opposite side may also be machined as a preventative measure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of servicing, or repairing a crack in, at least one side of a dovetail portion of a dynamoelectric machine's rotor coil slot wall, the rotor coil slot wall including a radial entry surface connected to an inwardly tapered surface, and the inwardly tapered surface is connected to an intermediate radial surface, the method comprising:
    machining a first groove in the radial entry surface and the inwardly tapered surface, the first groove comprising a single groove continuously extending linearly to and ending at the intermediate radial surface, the first groove configured so that a smooth and linear surface is created along a length of the first groove, and the first groove is oriented to extend in a direction about 20 degrees from the radial entry surface;
    machining a second groove in the intermediate radial surface in an orientation substantially perpendicular to the first groove, at least a portion of the second groove contacting a portion of the first groove; and
    wherein at least one of the first groove and the second groove are configured to remove damaged material from the coil slot wall.

2. The method of claim 1, wherein the first groove has a maximum depth of about 0.195 inches.

3. The method of claim 1, wherein the first groove is about 0.37 inches or more wide.

4. The method of claim 1, wherein the first groove and the second groove are concave.

5. The method of claim 1, further comprising:
    replacing at least two axially adjacent steel wedges with aluminum replacement wedges, such that the first groove is centered on a butt joint between two axially adjacent replacement wedges.

6. The method of claim 1 wherein the machining steps are carried out on an opposite side of the coil slot wall as a preventative measure.

7. The method of claim 1, wherein edges of the first groove and the second groove are radiused.

8. The method of claim 1, wherein the dynamoelectric machine is a motor or a generator.

9. A generator rotor repaired according to the method of claim 1.

10. A method of servicing, or repairing a crack in, at least one side of a dovetail portion of a rotor coil slot wall in a generator, the rotor coil slot wall including a radial entry surface connected to an inwardly tapered surface, and the inwardly tapered surface is connected to an intermediate radial surface, the radial entry surface and the intermediate radial surface being substantially parallel to each other, the method comprising:
    machining a first groove in the radial entry surface and the inwardly tapered surface, the first groove comprising a single groove continuously extending linearly from an outer rotor surface to and ending at the intermediate radial surface, the first groove configured so that a smooth and linear surface is created along a length of the first groove, and wherein the first groove is oriented to extend in a direction about 20 degrees from the radial entry surface or the first groove is oriented to extend in a direction about 70 degrees from the outer rotor surface;
    machining a second groove in the intermediate radial surface in an orientation substantially perpendicular to the first groove and substantially axially with respect to the generator, at least a portion of the second groove contacting a portion of the first groove; and
    wherein at least one of the first groove and the second groove are configured to remove damaged material from the coil slot wall or to act as a preventive measure against damage to the coil slot wall.

11. The method of claim 10, wherein the first groove has a maximum depth of about 0.195 inches.

12. The method of claim 11, wherein the first groove is about 0.37 or more inches wide.

13. The method of claim 10, wherein the first groove and the second groove are concave.

14. The method of claim 13, further comprising:
    replacing at least two axially adjacent steel wedges with aluminum replacement wedges, such that the first groove is centered on a butt joint between two axially adjacent replacement wedges.

15. The method of claim 13, wherein the machining steps are carried out on an opposite side of the coil slot wall as a preventative measure.

16. The method of claim 13, wherein edges of the first groove and the second groove are radiused.

17. The method of claim 16, wherein the second groove extends in an axial direction that is wider than an axial dimension of the first groove.

18. A generator rotor repaired according to the method of claim 10.

* * * * *